T. DIGNEY.
CURTAIN ROLLER.
APPLICATION FILED JUNE 8, 1907.
910,917.
Patented Jan. 26, 1909.
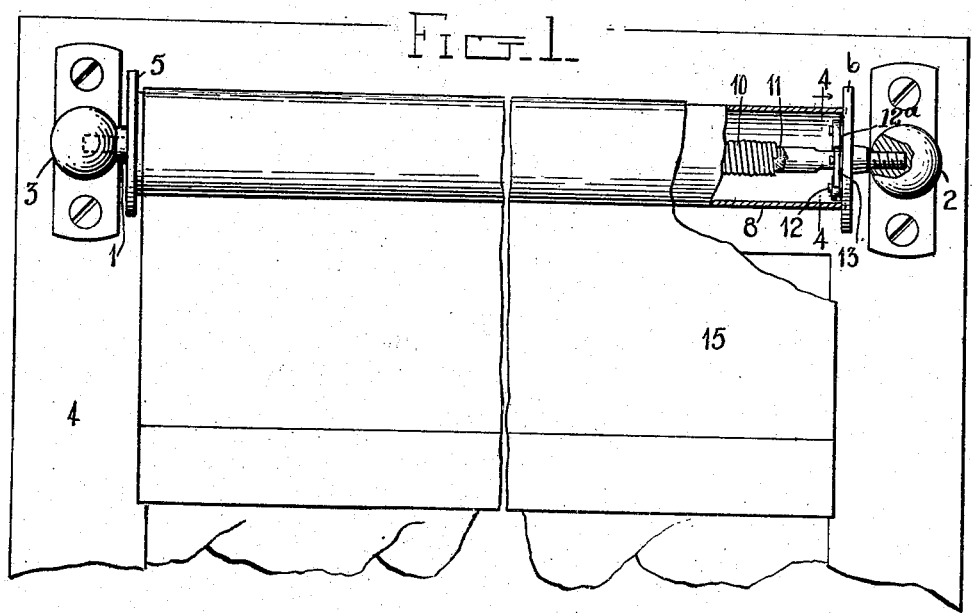
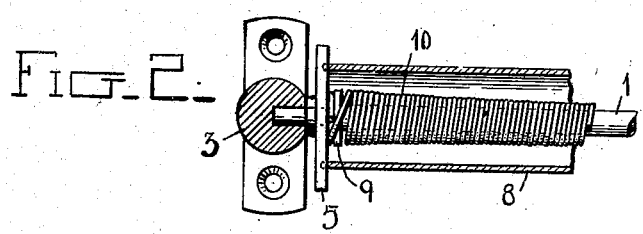
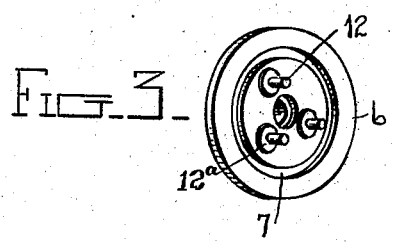 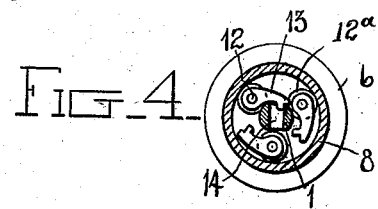
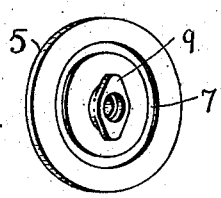
Witnesses
L. B. James
Ruth Raymond
Inventor
Thomas Digney
By Chamberlain & Newman
Attorneys

UNITED STATES PATENT OFFICE.

THOMAS DIGNEY, OF BRIDGEPORT, CONNECTICUT.

CURTAIN-ROLLER.

No. 910,917.   Specification of Letters Patent.   Patented Jan. 26, 1909.

Application filed June 8, 1907. Serial No. 377,887.

*To all whom it may concern:*

Be it known that I, THOMAS DIGNEY, a citizen of the United States, and resident of Bridgeport, in the county of Fairfield and State of Connecticut, have invented certain new and useful Improvements in Curtain-Rollers, of which the following is a specification.

This invention has relation to shade rollers, and it consists in the novel construction and arrangement of its parts, as hereinafter shown and described.

The object of the invention is to provide a roller of the character indicated which is especially adapted to be used upon the windows of carriages and automobiles and so forth. The parts are compactly arranged, inclosed and occupy but small space and consequently present no obstruction to those entering or leaving the vehicle.

The roller consists primarily of a shaft supported at its ends in brackets which are attached to the sashing or casing of the window, and the said roller is held against rotation in the said bracket. A cylinder is closed at its ends by heads, and the said heads are journaled for rotation upon the shaft. One of the said heads is provided with a boss to which one end of a coiled spring is attached; the said spring surrounds the shaft and lies entirely within the cylinder, and its opposite end is fixed to the shaft. The opposite end portion of the shaft is provided with a transverse opening, and the other cylinder head is located adjacent the said opening. The last said cylinder head is provided upon its inner side with integral pins upon which are pivotally mounted pawls. The pins and pawls are preferably three in number. The inner faces of the cylinder heads are provided with concentric grooves which receive the ends of the cylinder, and the cylinder ends are secured in the said grooves by means of solder, thus inclosing all the operative parts of the roller. The shade is arranged to wind upon the cylinder and unwind from the same in the usual manner.

In the accompanying drawings:—Figure 1, is a front elevation of the shade roller with parts in section. Fig. 2, is a sectional view of one end of the roller, showing the manner of attaching one end of the spiral spring to one of the cylinder heads. Fig. 3, is a perspective view of the cylinder head used at the opposite end of the cylinder showing integral pins but with the pawls removed. Fig. 4 is a transverse sectional view of the cylinder cut on the line 4—4 of Fig. 1, and showing operative position of pawls. Fig. 5 is a perspective view of the head used at the opposite end of the cylinder.

The shade roller comprises the shaft 1, one end of which is screw threaded into the bracket 2, and the opposite end slidably enters the bracket 3. The said brackets 2 and 3 are adapted to be screwed or otherwise secured to the window sashing or casing 4. The cylinder head 5 is journaled upon one end of the shaft 1, and the cylinder head 6 is journaled upon the opposite end thereof. The heads 5 and 6 are provided with concentric grooves 7, which receive the opposite ends of the cylinder 8. The head 5 is provided upon its inner face with a boss 9 to which is attached one end of the coiled spring 10. The said spring surrounds the shaft 1 and lies wholly within the cylinder 8, and its opposite end is attached to the shaft 1 at the point 11. The head 6 is provided upon its inner face with the integral pins 12 preferably three in number. The pawls 13 are pivotally mounted upon the said integral pins, and the inner ends of the said pins are slightly flattened or riveted for the purpose of retaining the said pawls thereon. This integral construction of pins obviously avoids the necessity of drilling the said head and providing special pins which have to be placed and secured therein. Surrounding the base of each integral pin I provide a slightly raised milled bearing $12^a$ which holds the parts off from the head and insures their free operation. The shaft 1 is provided in the vicinity of the head 6 with a transversely-disposed perforation 14 which is adapted to receive the end of any one of the pawls 13 in the usual manner. The shade 15 is attached to the periphery of the cylinder 8 and is adapted to wind thereon and unwind therefrom.

From the foregoing description it is obvious that a shade roller specially adapted for the purpose set forth is provided; that the parts are compactly arranged and offer no obstruction, and that the arrangement is of a simple and durable nature. The shade is manipulated by drawing the same so that the cylinder 8 rotates in one direction and increases the tension of the spring 10 when the said shade is released and the tension of the said spring comes into play, so that the cylinder 8 is rotated at such a rapid rate of speed as to swing the ends of the pawls 13 centrifugally against the inner side of the said cylinder and away from the perforation 14 in the shaft 1. At the same time the shade 15 is wound upon the said cylinder. When the shade is completely wound upon the cylinder or the rotation of the cylinder 8 is checked, the end of one of the pawls 13 will fall in the perforation 14 and retain the cylinder 8 against further rotation.

What I claim is:—

1. A shade roller comprising a stationary shaft upon which is journaled a revolving member, a flat portion adjacent one end of said shaft having a slot extending therethrough, pawls for engaging said slot mounted on said revolving member, screw threads on one end of said shaft adapted to screw into a bracket and a reduced cylindrical portion on the other end to permit of longitudinal adjustment, said slot of a length sufficient to permit of shifting of said pawls during such adjustment.

2. As a new article of manufacture, a disk head for the revolving cylinder of a curtain roller, an annular groove on the inner surface of said head for the reception of said cylinder, integral pins within said groove having raised bases, and pawls pivoted on said pins and spaced from said disk face by said bases.

Signed at Bridgeport, in the county of Fairfield, and State of Connecticut this 4th day of June, A. D., 1907.

THOMAS DIGNEY.

Witnesses:
C. M. NEWMAN,
GEO. R. BURNES.